Sept. 11, 1928.

L. M. H. SCHUMAN 1,683,923

RADIUS ROD FOR MOTOR VEHICLES

Filed May 7, 1925

Inventor
LELAND M. H. SCHUMAN

By A. M. Houghton

Attorney

Patented Sept. 11, 1928.

1,683,923

UNITED STATES PATENT OFFICE.

LELAND M. H. SCHUMAN, OF SAVANNAH, GEORGIA.

RADIUS ROD FOR MOTOR VEHICLES.

Application filed May 7, 1925. Serial No. 28,766.

This invention relates to radius rods for motor vehicles and it comprises a plurality of divergent rigid rods extending from a central point adjacent the vehicle chassis to the ends of the front axle, said rods being pivotally mounted with respect to the engine frame or chassis and so secured to the axle as to permit of free rotative movement of the front wheels, and being so positioned as to resist to a highly efficient degree shocks and torsional stresses imposed on the axle arising either in normal service or from accidental causes and to prevent "shimmey" of the front wheels all as more fully hereinafter set forth and as claimed.

The invention is particularly adapted to the chasis construction employed in the Ford type of motor vehicle, although it will be understood that the invention may also be applied to other chassis for which it is adapted.

In the ordinary type of Ford motor, as made at the present time, the axle is given a slight pitch or cast toward the rear of the car, and the natural tendency of the axle is to turn rearwardly under the influence of heavy shocks or strains. In earlier types of Ford cars, this tendency was slightly resisted by the radius rods forming a part of the cars, which were secured to the upper side of the axle, and thus offered limited resistance to further deflection toward the rear. Now, however, the standard radius rods on Ford cars are secured to the bottom side of the axles, and hence do not offer much compressive resistance to rearward deformations.

A particular effect of the present known construction resides in the setting up of undue vibrations of the front wheels which interfere with satisfactory operation, and which are commonly referred to as "shimmey" effects. These effects are not overcome with the standard radius rods positioned on the bottom of the axle, as the axle itself, already turned rearwardly, may be bent still further rearwardly by shocks or heavy loads; a distortion that is not satisfactorily resisted by the radius rods secured to the lower side of the axle. In one aspect, the positioning of the radius rods below the axle, together with the rearward pitch thereof, creates a couple which tends to cause further rearward movement, thus increasing the "shimmey" effect.

According to the present invention, the distortions usually encountered in Ford axles are prevented by providing a pair of auxiliary radius rods, extending from the junction of the standard radius rods to the extreme ends of the axle, and to a high point above the longitudinal line thereof and advantageously attached by means of the spindle body bolts. Means for effecting the aims of the present invention are shown in the drawing, wherein, Fig. 1 is a front elevational view of a front axle of a Ford motor car;

Figure 1:
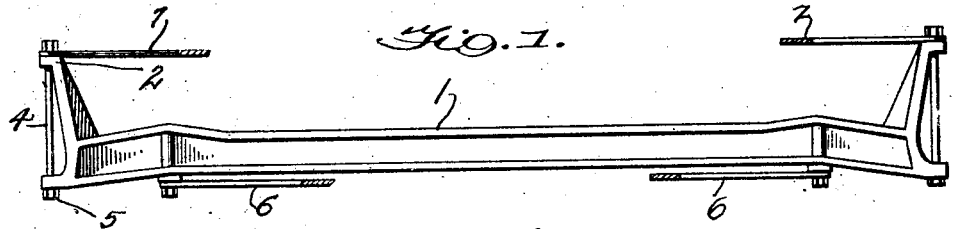
Figure 2:
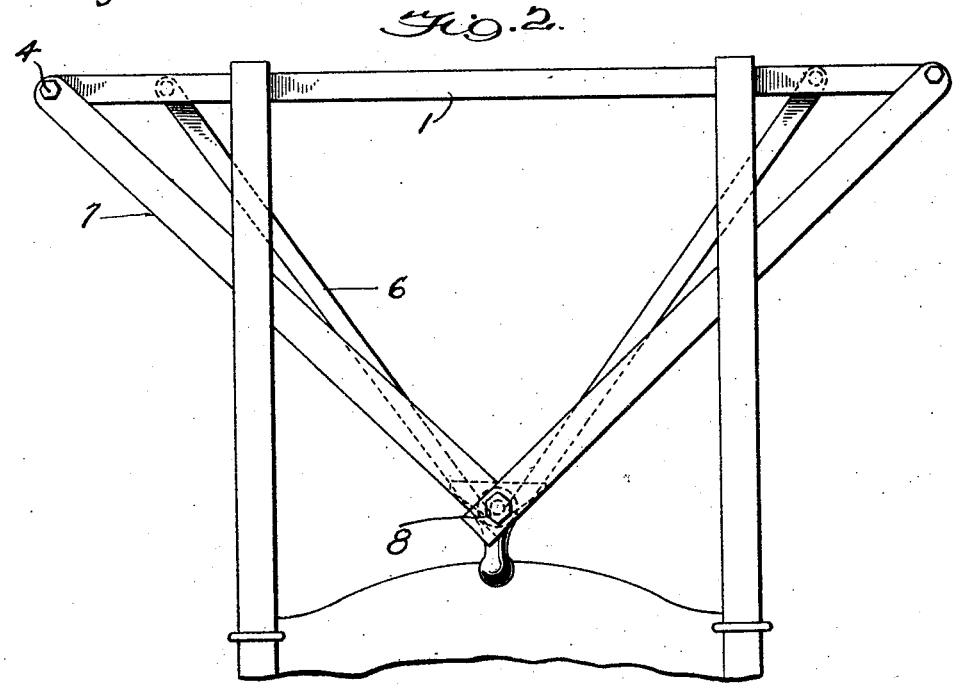
Fig. 2 is a diagrammatic plan view of a Ford chassis, showing the standard radius rods and the auxiliary radius rods in operative position.

The axle shown in Fig. 1 is of regular or standard contour, and is indicated as a whole by the reference numeral 1. Each end of the axle is formed with a yoke provided with an upper boss 2 pierced for the reception of a spindle body bolt 4 by means of which the wheel elements are held in place, and which bolt is secured by means of a nut 5. Located inwardly from the extremities of the axle 1, and secured to the lower side thereof, are a pair of radius rods 6, which converge inwardly to a common point adjacent the engine casing. It is standard practice to secure the two rods 6 to each other with a common ball head, as shown in Fig. 2 which seats in a socket in the engine casing. As thus far described, the parts are all of the usual and well understood present day construction.

Figure 4:
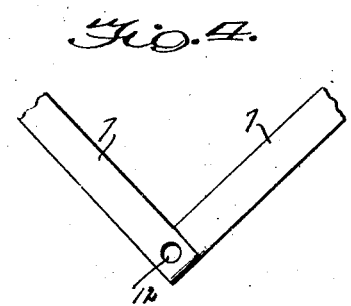
Figure 3:
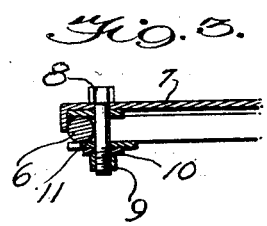
Fig. 3 is a detail in cross-section taken through the junction of the radius rods and partially revolved; and, Fig. 4 is a fragmentary plan view of the auxiliary rods at the junction showing a manner of lapping the ends.

According to my invention, I provide a pair of auxiliary radius rods 7, each of which is secured, at its outer end to the spindle body bolt 4, being interposed between the bolt head and the boss 2. I position the end of the rod as high above the outer terminus of the rod 6 as is convenient, thereby obtaining a maximum leverage to resist strains or loads that would tend to turn the axle 1 rearwardly. For like reasons, I position the ends of the rods 7 at the extremities of the axle 1, as the increased angle of divergence of the rods 7 over the rods 6 serves to increase the resistance offered by the rods to bending stresses. The rods 7 converge and join at the point of juncture of the radius rods 6, so that all rods turn from the same center and hence do not interfere with the free turning of the front wheels. The ends of the rods 7 are lapped or turned over the respective rods 6, as best shown in Figs. 3 and 4, thus preventing slippage in a forward direction which would permit the axle 1 to alter its vertical alignment.

A bolt 8, provided with a nut 9, washer 10, and clamping plate 11, is employed to secure the rods 6 and 7 together in a satisfactory manner, and is positioned through an aperture formed through all of the rods at their junction.

As noted above, the rods 7 are so disposed as to offer a high resistance to distortion of the front axle, and to prevent its rearward movement. Such prevention reduces the development of "shimmey" effects, which would be augmented by increasing the rearward cast or pitch of the front axle. Being disposed in different planes than the standard rods 6, the auxiliary rods 7 exert a maximum resistance to shock loads that would otherwise cause axle distortion or misalignment. The device not only functions under ordinary conditions, but also serves as a relief for accidental shocks. For example, under shocks due to collision, all of the load would normally be thrown in a single line along either rod 6. With the auxiliary rods in place, this collision load is divided, part being taken by the auxiliary rods 7. If either rod is broken, the other may still serve for emergency purposes until proper repairs can be made. Likewise, the divergence between adjacent rods 6 and 7 prevents all of such collision loads being transmitted to the engine casing in one line, and hence the possibility of destructive strains on the engine from such collisions is proportionally diminished.

I claim:

In a motor vehicle having a front axle formed with a yoke at either end adapted to receive a wheel assembly and provided with a pair of standard radius rods secured to the lower side of the axle and inwardly from the extremities thereof; a pair of divergent auxiliary radius rods respectively extending from a point in common with the standard radius rods to the extremities of the axle and to the upper side of the spindle yoke thereof, said rods being secured to the extremities of the axle by means of a spindle bolt adapted to receive and support the wheel assembly.

LELAND M. H. SCHUMAN.